W. L. MORELAND.
VEHICLE LOADING AND UNLOADING MECHANISM.
APPLICATION FILED MAY 28, 1913.
1,132,960.
Patented Mar. 23, 1915.
2 SHEETS—SHEET 1.
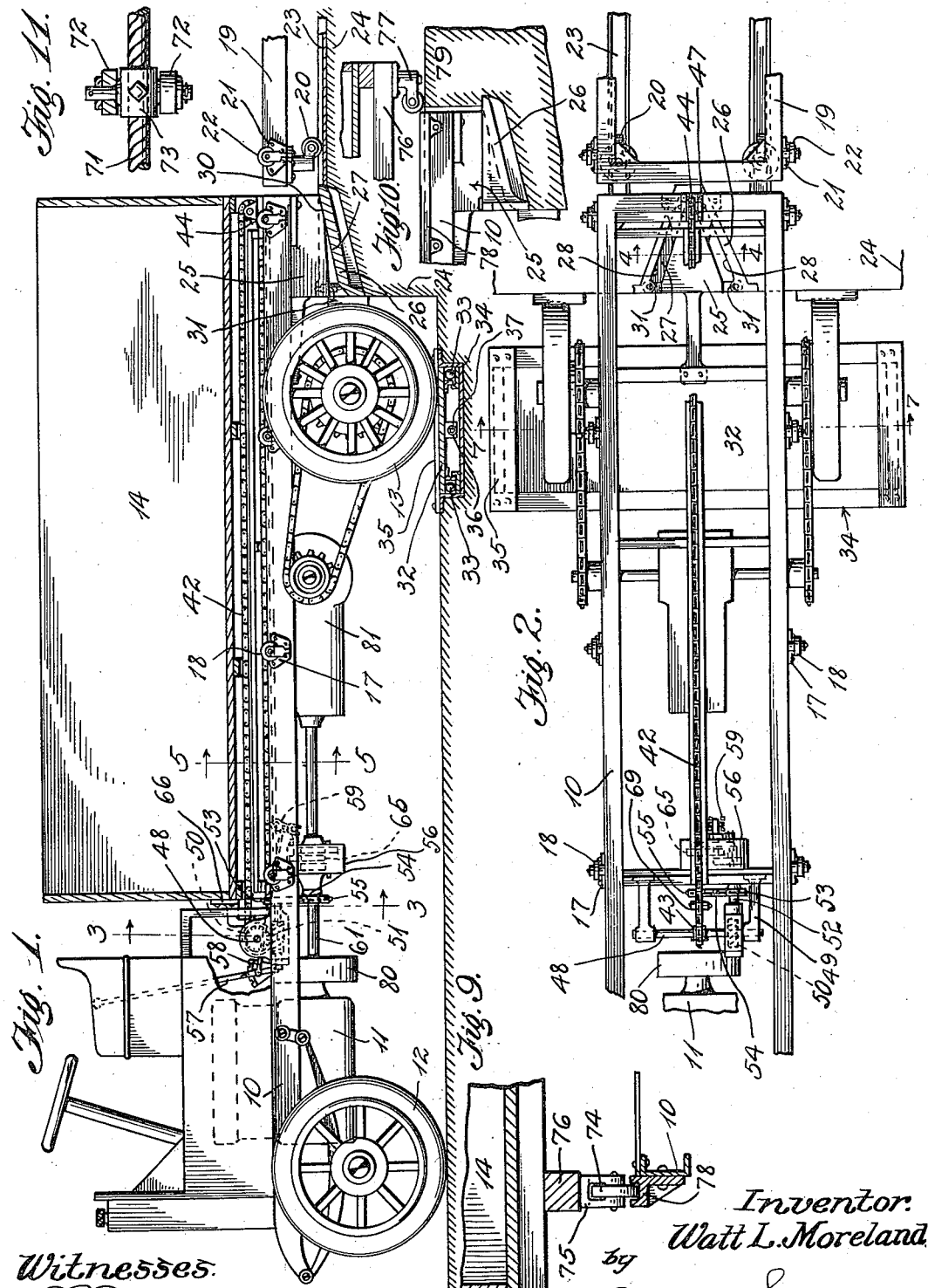
Witnesses.
E. R. Pollard
Euclid Martin
Inventor:
Watt L. Moreland
by
Cassell Severance
Atty.

W. L. MORELAND.
VEHICLE LOADING AND UNLOADING MECHANISM.
APPLICATION FILED MAY 28, 1913.
1,132,960.
Patented Mar. 23, 1915.
2 SHEETS—SHEET 2.
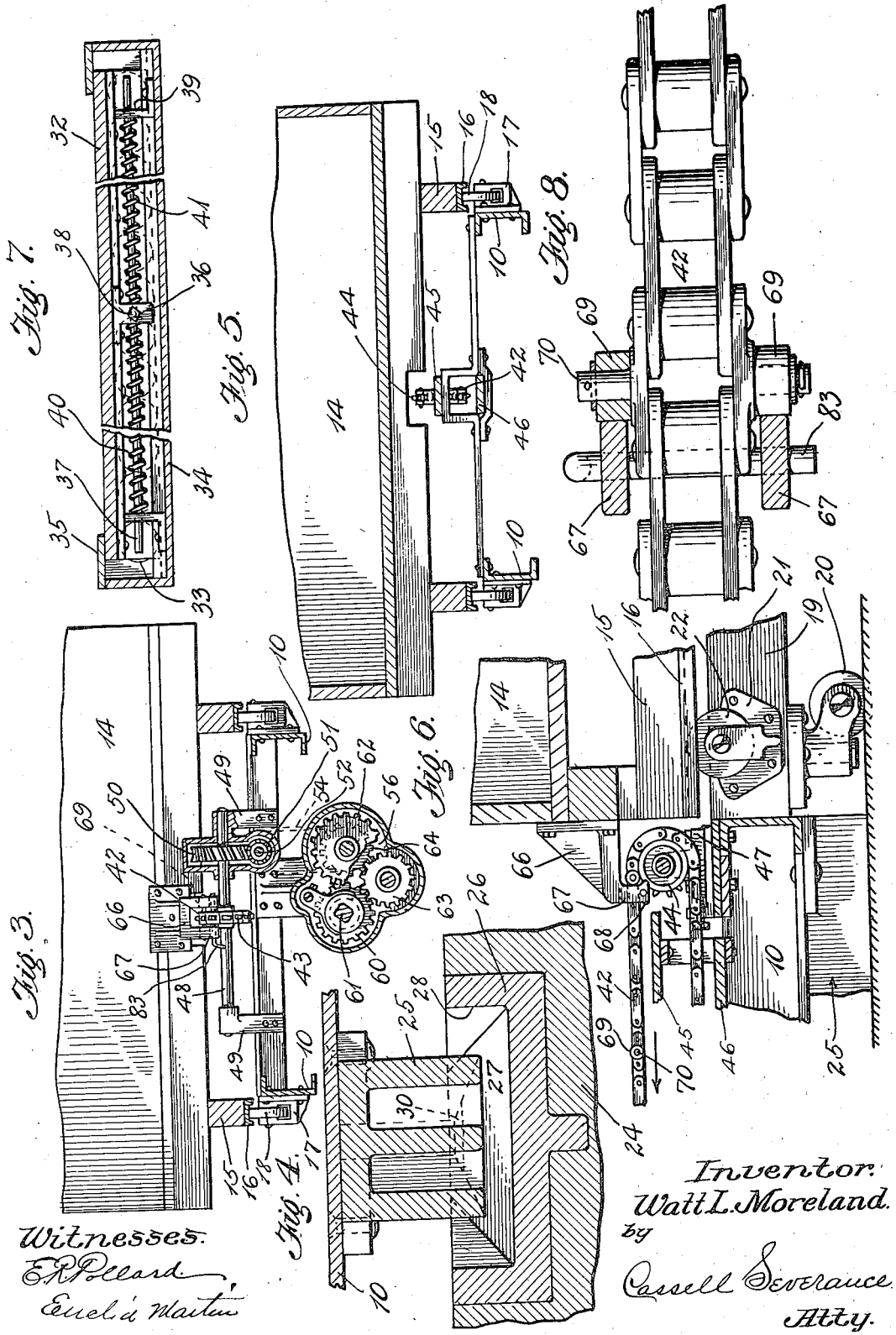
Inventor:
Watt L. Moreland.
by
Cassell Severance
Atty.
Witnesses.

UNITED STATES PATENT OFFICE.

WATT L. MORELAND, OF LOS ANGELES, CALIFORNIA, ASSIGNOR OF ONE-HALF TO MORELAND MOTOR TRUCK COMPANY, OF LOS ANGELES, CALIFORNIA, A CORPORATION OF CALIFORNIA.

VEHICLE LOADING AND UNLOADING MECHANISM.

1,132,960.     Specification of Letters Patent.     Patented Mar. 23, 1915.

Application filed May 28, 1913. Serial No. 770,381.

*To all whom it may concern:*

Be it known that I, WATT L. MORELAND, a citizen of the United States, residing at Los Angeles, in the county of Los Angeles and State of California, have invented certain new and useful Improvements in Vehicle Loading and Unloading Mechanism, of which the following is a specification.

This invention relates to improvements in vehicle loading and unloading mechanisms, and particularly to mechanisms adapted to remove or replace a load carrying portion of a vehicle.

It is an object of the invention to provide a centering and directing mechanism for facilitating the delivery of the load-carrying portion or body of a vehicle opposite a given or desired point for discharge or loading.

It is also an object of the invention to provide a motor vehicle with a removable body portion, and a means capable of operation by the power mechanism of the vehicle for moving said body off the frame of the vehicle or replacing the same thereon.

It is a still further object of the invention to provide a vehicle mechanism, having a removable load-carrying body portion, with means for directing one end of the vehicle and holding the same at a given point at a landing stage or platform.

It is also a still further object of the invention to provide a vehicle loading and unloading means for a motor driven vehicle, in which the motor may be connected with the unloading mechanism when it is desired to move the body portion of the vehicle from its frame to a landing platform or stage, or vice versa.

With these and other objects in view the invention consists of certain novel constructions, combinations and arrangements of parts as will be hereinafter fully described and claimed.

In the accompanying drawings forming a part of this specification, Figure 1 is a view of a motor vehicle and its unloading mechanism, parts being shown in side elevation and parts being shown in longitudinal central section, the adjacent parts of a landing platform or stage being also shown in vertical section. Fig. 2 is a body plan view of a portion of the vehicle frame or chassis and also showing a portion of the landing platform and the movable support for the rear end of the vehicle. Fig. 3 is a detail vertical sectional view taken transversely of the mechanism upon the line 3—3 of Fig. 1. Fig. 4 is a fragmentary detail sectional view taken upon the line 4—4 of Fig. 2, the parts being shown, however, upon an enlarged scale. Fig. 5 is a detail transverse sectional view taken upon the line 5—5 of Fig. 1. Fig. 6 is a fragmentary vertical sectional view taken through the rear end of the vehicle frame or chassis to the forward end of the removable body of the vehicle, as it is just about to be carried upon the said frame or chassis, the parts being shown upon an enlarged scale. Fig. 7 is a vertical sectional view of the vehicle supporting platform with its movable support taken upon the line 7—7 of Fig. 2. Fig. 8 is an enlarged fragmentary plan view of a portion of the endless chain employed for moving the body of the vehicle back and forth. Fig. 9 is a detail fragmentary sectional view through one side of the vehicle chassis and of the adjacent part of the vehicle body, but showing the supporting walls for the body mounted thereon instead of being attached to the side bar of the chassis. Fig. 10 is a detail sectional view taken vertically through a landing platform but showing the parts so related that the body portion of the vehicle may move upon the platform upon its own walls or casters. Fig. 11 is a detail view partially in elevation and partially in section showing a portion of an actuating cable employed in the place of the chain shown in Fig. 8, one of the tappet devices or detents employed thereon to be shown.

The mechanism of the present invention is designed to afford a means whereby the loads of vehicles may be readily transferred therefrom to a landing platform or support of any kind or be placed upon the said vehicle from said platforms or supports, as the case may be. The mechanism is adapted to various kinds of vehicles, but more particularly to motor driven vehicles, and is especially suited for commercial trucks in which goods or materials of various kinds are to be loaded upon and unloaded from the said vehicle. The structure of the mechanism is such that the body portion of a vehicle may be moved from the frame or chassis thereof to a platform or landing stage, floor or the like, the mechanism also being formed so that the end of a vehicle backed up to the said stage or floor will be properly directed and centered opposite the point thereon upon which it is desired to move the body of the vehicle.

In the accompanying drawing the preferred structure of the mechanism forming the subject matter of the present invention has been illustrated, and the details and features thereof will now be more specifically described. In said drawing 10 indicates the frame or chassis of a motor vehicle, 11 a motor mounted thereon and 12 and 13 the front and rear wheels respectively of said vehicle. The vehicle is constructed with a removable body portion 14, of any desired shape or size, and the bottom of said body portion is provided with longitudinal supporting sills or beams 15, to the under edges of which are secured guiding strips 16, preferably made in the form of channel strips as clearly shown in Figs. 3, and 5 of the drawings. The vehicle chassis 10 may be of any usual or ordinary type, more generally of the commercial truck type, and brackets 17 are mounted upon the outer sides of the beams forming the sides of said chassis, the said brackets having rollers 18 journaled therein. The position of the said rollers 18 is such that they will simultaneously engage the grooves in the under sides of channel strips 16. The body 14 of the vehicle is thus movably mounted upon the said rollers and will be guided in its movement by the channel strips 16 engaging said rollers.

In transferring the body 14 in loaded or unloaded condition to a landing platform or floor, it is preferable to provide means whereby the said body may be moved about from place to place upon said floor or platform. A truck or wheeled frame 19 is preferably provided for this purpose, the frame of said truck 19 being made somewhat similar to the chassis or vehicle frame 10 and of the same width, so that the body 14 will fit thereon. The frame of the truck 19 is mounted upon suitable rollers or casters 20 and has brackets 21 attached to the sides thereof, similar to the brackets 17 upon the chassis and provided with supporting rollers 22. When the rear end of the vehicle is brought opposite the said truck 19 and the body 14 moved off from the same, the channel strips 16 will run upon the rollers 22 of the said truck 19 and guide the body 14 into proper position thereon for transportation to any part of the floor or platform. In order to guide the truck 19 to a suitable point opposite the vehicle, tracks or channel strips 23 may be mounted upon the platform or floor 24 as clearly shown in Figs. 1 and 2 of the drawing.

In order to enable the operator, driver or chauffeur of the vehicle to back the said vehicle into proper position with relation to the said truck 19, to receive the body 14 thereof, the vehicle is provided with a guiding and centering means which coöperates with a guiding means mounted upon the said platform or floor 24. The said guiding and centering mechanism preferably consists of a wedge member 25 carried by the vehicle chassis and usually secured to the under side thereof, the said centering means also comprising a wedge receiving member or plate 26 mounted in the edge and upper surface of the platform 24. The wedge member 25 is made of sufficient length to be bolted or riveted to the under side of the cross bars of the chassis 10 and is also formed with a wide and thick head portion approximately arrow shaped in top plan view as clearly illustrated in Fig. 2 of the drawing. The pointed edge of said wedge which is mounted beneath the rear cross bar of the chassis 10 is quite narrow, coming almost to a point while the wide part of said wedge is made of such width as to move the chassis laterally to a considerable extent in placing the vehicle opposite the truck 19. The coöperating wedge member 26 which is mounted in a correspondingly shaped depression formed in the platform 24 as shown in Figs. 1 and 4, is made with an inclined wall 27 and diverging sides 28 adapted to receive the pointed end of the wedge member 25 as the vehicle is backed toward the platform, the diverged side portions 28 guiding the wedge toward the middle portion of the member 26. The incline floor 24 of said member 26 also tends to lift the wedge member 25 when the vehicle is so heavily loaded as to depress its springs. It will be observed by reference to Fig. 1 that the underside of the wedge point 25 is beveled at 30 to engage and slide upwardly upon the incline floor 27 of the said member 26. To prevent friction at the outer edges of the member 26 anti-friction rollers 31 are mounted upon the vertical axes at the entrance portions to said member 26. The incline sides edges of the wedge member 25 engaging the said anti-friction rollers 31 will move readily and easily into said member 26. The wedge members 25 and 26 may be made of any desired structural forms and are preferably formed as indicated in the transverse sectional view taken through the said parts in Fig. 4, so that they may be comparatively light and yet amply strong for the purposes required.

In order to utilize the guiding and centering wedge devices just described, the rear end or wheels of the vehicle must be movably supported during the time that the wedge members are coming together. In order to make this possible, a movable support or plate 32 is located in the pavement, roadway or street opposite the wedge member 26, the said plate 32 being of a proper width to support the rear or drive wheels 13 during the time that the wedge members 25 and 26 are in engagement with each other. The plate 32 is preferably elongated on a rectangular plate of sufficient thickness to support the weight of the vehicle and roller bearings 33 are located in a housing 34 beneath the said plate 32. The plate 32 is made somewhat shorter than the inner longitudinal diameter of the housing 34 so that the said plate 32 may move say at least six inches each way from its center position in said housing 34. Cross retaining plates 35 are provided at the ends of the housing 34 to cover the spaces between the ends of the plate 32 and the ends of the housing 34 as clearly shown in Fig. 2. It will be observed that the plate 32 supported upon the ball bearings 33 will readily move in either direction with the wheels of the vehicle as the wedge 25 guides the rear end of the chassis to its proper position opposite the truck 19. In order to normally hold the said plate 32 in its central position before the truck rests upon the same, said plate is provided with a centrally located depending projection 36 upon its under surface and longitudinal rod, 37 extends through said projection and is clamped therein by set screw 38, the outer ends of said rod extending through apertures in guide brackets 39 secured in the housing 34. Centering springs 40 and 41 are slipped upon the rod 37 upon each side of the depending projection 36, their outer ends bearing against the brackets 39 and thus tending to center the said plate 32. The springs 40 and 41 are made sufficiently light, however, as not to interfere, in any way, with the movement of the plate 32 in accommodating itself to the position taken by the vehicle under the action of the wedge 25.

The movement of the body 14 longitudinally upon the chassis 10 is effected by means of an endless flexible member, as for instance, the sprocket chain 42 which engages sprocket wheels 43 and 44 mounted at the front and rear portions of the said chassis 10. The chain is arranged to run underneath the longitudinal central portion of the said body 14 and the intermediate portions of its upper and lower laps are prevented from sagging by traveling over strips or bars 45 and 46 secured centrally of the chassis and upon transverse braces connecting the sides thereof. The rear sprocket wheel 44 is carried by a bracket 47 secured to the rear cross bar of the chassis 10. The forward sprocket wheel 43 is mounted upon and rigidly secured to an actuating shaft 48 journaled in brackets 49 secured to the chassis. A worm wheel 50 is also secured to said shaft 48 and is engaged by a worm 51, whereby it is driven, for turning the shaft 48. The said worm is secured to a shaft 52 which is provided with a sprocket wheel 53, said sprocket wheel being connected by a sprocket chain 54 with a sprocket wheel 55 connected with a change gear mechanism 56. The said change mechanism is of any desired type and is so arranged that the sprocket wheel 55 may be driven either in one direction or the other for actuating the worm and moving, through the mechanism described, the chain 42. A hand lever 57 is connected by means of link 58 with a shifting lever 59 adapted to change the gears and thus control the direction of movement of the said body 14. The said change gear mechanism 56 is provided with a gear 60 secured to a squared portion of the engine or motor shaft 61 and is adapted to mesh with gear 62 forming a part of the change gear mechanism 56 for moving the body in one direction and is also adapted to mesh when moved longitudinal of the engine shaft 61, with a gear 63 which meshes with a gear 64 also secured to the shaft of the gear 62. The position of the intermediate gear 63 will thus cause the body to be moved in the opposite directions. The gear 61 is also capable of being brought to a position as indicated in dotted lines at 65 in Fig. 1 so as to not engage either of the gears 62 or 63 and, therefore, not actuate the body moving mechanism.

It will be understood that any desired form of change gear mechanism may be substituted for that described but the mechanism just set forth is found in practice to be admirably adapted for the accomplishment of the desired purpose. The structure of the mechanism is such that the body may be moved by the motor 11 which is employed to drive or propel the vehicle itself.

The operation of the loading and unloading mechanism will be readily understood in connection with the above description. When the chauffeur is about to approach the landing floor or stage 24 he backs the vehicle toward the same and approximately directs the rear end of the vehicle toward the wedge 26. The wedge 25 will engage the said member 26 even when the chauffeur has not succeeded in moving the vehicle very close to the proper alinement for moving the body upon the truck 19. By the time the wedge members have begun to engage each other, the rear wheels 13 will rest upon the movable plate or platform 32 and the end of the vehicle can move with the wedge 25 without difficulty. The body portion 14 will thus be in alinement with the truck 19 which is also put in place by running it upon channel tracks 23. Upon stopping the vehicle, thus properly positioned, the chauffeur has only to move the lever 57, with his motor clutch disconnected, in order to arrange the change gears in readiness for moving the body 14. Upon lifting his foot from the clutch lever and permitting the engine to turn the shaft 61, the sprocket chain 42 will be actuated for moving the body 14 from the chassis to the truck 19. By the use of interchangeable bodies and having a plurality of them on hand, another truck 19 may be moved into place with a loaded body and be arranged to engage the chain 42 so that it may be drawn upon the chassis and transported with its load to any desired destination. In order to be capable of engaging the actuating chain 42 the body 14 is provided with a bracket 66 preferably at its forward end, having a downturned bifurcated portion 67 adapted to embrace the said chain 42. The lower ends of said bifurcated portion are preferably widened as at 68, so as to readily hook upon and engage rollers 69 secured to journals 70, which project from opposite links of the chain 42, as clearly shown in Fig. 8. A removable pin 83 may be used if desired and passed through apertures in the lower ends of the bifurcated portion 67 to prevent the chain from dropping too low at intermediate positions in path. Two sets of journals 70 and rollers 69 are preferably provided upon the chain 42 at a suitable distance from each other, as shown in Fig. 6, one set being adapted to pull the body from the truck 19 upon the chassis, while the other or forward set, when on the upper lap of the chain, is adapted to push the body portion 14 off the chassis. The rear set of rollers 69 will pass downwardly and around the sprocket wheel 44, so as to be out of the way when the body is being pushed off the chassis. It will be understood that other forms of flexible driving members may be employed instead of the chain 42 without departing from the spirit of the invention. Thus, as shown in Fig. 11, a cable 71 may be used, if preferred, and tappet rollers 72 be secured thereto, by means of a sleeve 73 fastened to said cable. The action of the parts in acting upon the bracket 66 will be the same as when the chain 42 is used. It will be also understood that other details of the invention may be altered and mechanical equivalents substituted therefor, within the spirit and scope of the invention. Thus the body of the vehicle may have its supporting wheels or rollers as 74 carried by brackets 75 secured to its sills 76, as illustrated in Figs. 9 and 10, the wheels at the center of the body being preferably in fixed brackets, as shown in Fig. 9, while the end wheels, as shown in Fig. 10, may be in the form of casters 77. In this modified arrangement, channel guide bars 78 are secured to the chassis and direct the movement of the supporting wheels or rollers secured to the said body. With this form of device, the truck 19 may be dispensed with and the body portion of the vehicle may be rolled directly upon the floor, or platform, as indicated at 79. In connection with this formation of mechanism also the wedge member 26 is mounted at a lower point in the front face of edge of the said platform or floor, as clearly shown in Fig. 10. The action of the parts is practically the same as heretofore described with respect to the use of the truck 19.

A loading and unloading device of this character is found especially useful in connection with commercial vehicles where it is desirable to load one body while another, previously loaded, is being transported to its destination. Upon the return of the vehicle with its empty body, the said body can be readily run off from the chassis and to a point upon the floor or platform where it may be reloaded, and at the same time a loaded body may be again placed upon the chassis for delivery without keeping the vehicle idle.

The change gear mechanism employed for facilitating the movement of the body of the vehicle is preferably so located as to permit of the use of the usual clutch provided with the motor. Thus, as illustrated in Fig. 1, the said change gear mechanism is arranged between the motor 11 and its clutch 80 and the change gear mechanism 81 controlling the driving wheels of the vehicle. It will be evident, however, that other relative arrangements of parts capable of the same results may be used within the spirit of the invention.

What is claimed is:

1. A loading and unloading mechanism for vehicles comprising a centering member projecting from the vehicle frame, a coöperating guide member secured to a landing platform and means upon the vehicle for actuating the load carrying portion thereof for moving it from the frame to the landing platform or replacing it upon said vehicle frame.

2. A loading and unloading mechanism for vehicles comprising a laterally movable support to receive the wheels of the vehicle and means for moving the vehicle and thereby the said support opposite the point where the loading and unloading operation is to be effected.

3. A loading and unloading mechanism for vehicles comprising a movable floor adapted to receive the weight of the vehicle and a wedge mechanism for moving the vehicle opposite the unloading point.

4. A loading and unloading mechanism for vehicles comprising a movable wheel supporting floor, bearings supporting said floor, means for normally centering said floor when not engaged by the wheels, and a platform engaging wedge carried by the vehicle adapted to move the wheels to a point opposite the unloading position desired.

5. In an unloading mechanism for vehicles, a movable support for one end of the vehicle, a positioning device controlling that end of said vehicle, a load receiving truck, means for positioning the same opposite the end of the vehicle and mechanism for moving the load carrying portion of the vehicle from the frame of the vehicle to the said truck.

6. A loading and unloading mechanism for vehicles, comprising in combination with a vehicle frame having a removable vehicle body portion, of rollers mounted upon said frame portion and adapted to support said vehicle body portion, guideways carried by said vehicle body portion and engaging said rollers, a body receiving truck having rollers thereon and wedging means for bringing the vehicle body into alinement with the said truck whereby the guideways will engage the rollers of said truck, when the vehicle body is moved from the frame thereof to said truck.

7. In an unloading mechanism for vehicles the combination with a vehicle chassis and a motor for driving the same, of a movable load carrying body mounted on said chassis, an endless chain for actuating said body, tappets secured to said chain, a bracket mounted upon the said body and adapted to engage said tappets, worm gearing for driving said chain and an intermediate change gear mechanism for communicating movement from the vehicle motor to said worm gearing whereby the body portion may be moved back and forth.

8. A loading and unloading mechanism for vehicles comprising a wedge carried by a vehicle, stationary means for engaging the wedge capable of moving a portion of the vehicle laterally and coöperating means for movably supporting the portion of the vehicle to be moved.

9. A loading and unloading mechanism for vehicles comprising a directing projection carried by the vehicle frame, a coöperating landing guide for receiving said projection, a movable platform arranged to receive the wheels of the vehicle, said platform having a projection upon its underside, springs, engaging said projections upon opposite sides thereof and means forming abutments for said springs, the springs being capable of yielding to permit the moving of the vehicle and platform under the action of the guiding projection and yet tending to return the platform to its normal central position after the vehicle has been run off from said platform.

In testimony whereof, I have hereunto set my hand, in presence of two witnesses.

WATT L. MORELAND.

Witnesses:
CASSELL SEVERANCE,
LILLIE VOLLMER.